Feb. 21, 1967  G. F. QUITTNER  3,305,711
APPARATUS FOR POSITIONING A PIPE SAMPLE CIRCUMFERENTIALLY
BY SENSING OF DISTURBANCES IN A NULL PLANE BETWEEN
OPPOSITELY POLARIZED EXCITER COILS
Original Filed Aug. 22, 1962

INVENTOR.
GEORGE F. QUITTNER
BY Richard MacCutchen

ATTORNEY

United States Patent Office 3,305,711
Patented Feb. 21, 1967

3,305,711
APPARATUS FOR POSITIONING A PIPE SAMPLE CIRCUMFERENTIALLY BY SENSING OF DISTURBANCES IN A NULL PLANE BETWEEN OPPOSITELY POLARIZED EXCITER COILS
George F. Quittner, Cleveland Heights, Ohio, assignor, by mesne assignments, to API Instruments Company, Chesterland, Ohio, a corporation of Ohio
Original application Aug. 22, 1962, Ser. No. 218,783, now Patent No. 3,271,662, dated Sept. 6, 1966. Divided and this application Jan. 4, 1966, Ser. No. 518,601
3 Claims. (Cl. 318—31)

This application is a division of my co-pending patent application Serial No. 218,783, filed August 22, 1962, later Patent No. 3,271,662 and relates to magnetic and/or eddy current flaw detection devices and has particular significance in connection with equipment for positioning sample material in the form of metallic sheet or tube (a tube merely amounting to a wound up sheet). In one aspect the present invention discloses and claims improvements over the arrangements disclosed in U.S. Patent 3,156,862, issued Nov. 10, 1964 upon an application filed by N. A. Herrick.

As described in the above mentioned patent, two or more exciting coils are located on one side of sheet material to be inspected, and on the opposite side of the sheet are sensing coils, all of the coils being located with their axes essentially perpendicular to the broad faces of the sample. In some situations, however, such an arrangement has led to the following difficulties: (1) an impractically large amount of excitation power may be required to produce adequate fields on the opposite side of the sample sheet; (2) in the inspection of pipe it is usually not practical to place one half of the "excitation-sensing" arrangement inside and the other half outside the pipe and still maintain between the parts a fixed geometric relation particularly when there is relative movement of sample with regard to the flaw-finding apparatus; (3) in many existing processing lines it is difficult to install a two sides of sample excitation sensing arrangement, due simply to space limitations; (4) with excitation on opposite side of sample from sensing, sensitivity is not predictably related to distance from coils to sample though it is often advantageous to have it so, for example when it is desired that inspection sensitivity vary according to some predetermined plan.

It is an object of the present invention to provide simple means for overcoming the above mentioned difficulties.

Another object is to provide arrangements permitting excitation and pickup on the same side of a sheet or tube material.

Another object of the invention is to provide means for accurately positioning tubing having a longitudinal weld or seam.

Other objects and advantages will become apparent and the invention may be better understood from consideration of the following description taken in connection with the accompanying drawings, in which.

Figure 1:
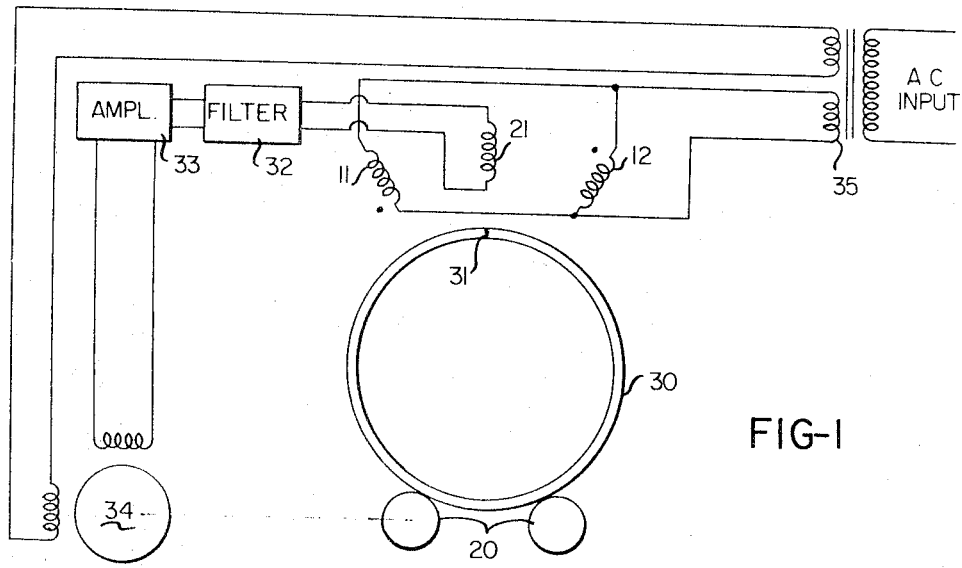
FIG. 1 is a diagrammatic representation of a positioner for a seam welded pipe sample.

Referring now to the drawings, FIG. 1 shows a one side of sheet (the sheet being closed on itself as a tubing) arrangement where exciter coils 11 and 12 are oppositely phased (by direction of winding with respect to connections) as indicated by the dot convention. A null plane is established between them, as explained in the Herrick patent, and a single pickup coil 21 has its axis located substantially in the null plane between the exciter coils. A pipe sample 30 is a sheet closed upon itself by a weld 31. For processing purposes it is often desirable that the pipe be automatically positioned so that the weld is located always at one position, for example accurately on top. When the weld is located precisely beneath coil 21, the output voltage of coil 21 will be null, or at least consist primarily of harmonics and other noise. By passing this voltage through a filter 32, nearly all of any residual voltage can be eliminated, the filter being tuned to pass only excitation frequency. When the pipe is accurately positioned, therefore, the output of a filter fed amplifier 33 will be essentially zero. However a slight position inaccuracy can produce amplifier output of considerable amplitude and of a phase either due to coil 11 or due to coil 12 (depending on error direction). By using a conventional two-phase servo motor 34, with one phase supplied directly by a transformer 35 which also supplies alternating current to the exciter coils 11 and 12, the motor operates in correct direction to return the weld toward equilibrium (null) position. Conventional means (not shown) may be used to delay or advance one of the phases to the servo motor by approximately 90° in order to obtain the usual two phase self-starting condition.

Figure 2:
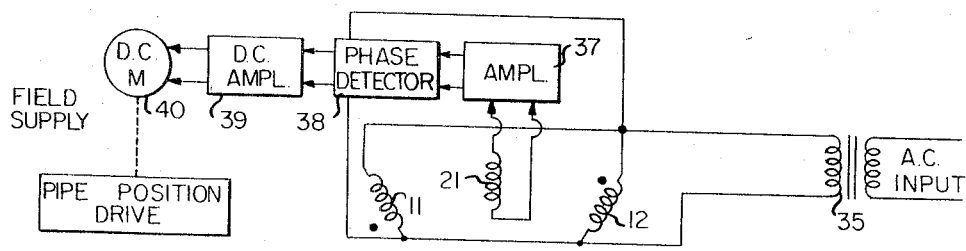
FIG. 2 is a schematic representation of another arrangement for positioning such a pipe sample.

A modification is shown in the schematic diagram of FIG. 2. Here coils 11, 12 and 21 are positioned as before about the pipe (not shown), while sensing coil 21 directly feeds an amplifier 37 whose output is fed into a phase detector 38 which may be of conventional type.

Figure 3:
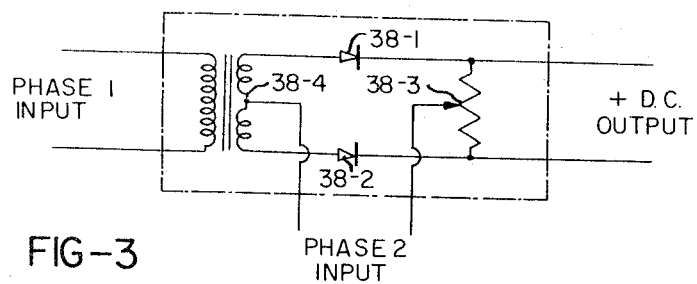
FIG. 3 is a detail showing a conventional bridge circuit which may be used to perform the function of the phase detector 38 of FIG. 2.

In FIG. 3 is shown one of many suitable and known types of phase detectors useful in block 38 of FIG. 2. In the particular arrangement in FIG. 3 the voltage entering as phase 2 is applied to two rectifiers 38–1 and 38–2 simultaneously, so that during half of the period of phase 2 the two rectifiers cannot conduct at all because they are heavily back-biased. During the other half, of phase 2 period, they conduct heavily, being forward energized by phase 2. However, during forward conduction by phase 2, essentially no output voltage is generated as a result of correctly selecting the tap position of an output potentiometer 38–3. Meanwhile, phase 1 appears as two 180° out-of-phase voltages with respect to a transformer center tap 38–4. If during any part of the conduction time due to phase 2 either the upper or lower rectifier conducts additional current because of the contribution of phase 1, this current will not be balanced out by the output voltage divider, and therefore will appear as D.C. pulses at the output whose direction and amplitude depend on the phase relations between phase 1 and phase 2. The pulses may be integrated (smoothed) if desired.

Returning to consideration of FIG. 2, the phase detector output is amplified at 39 and used to run a D.C. motor 40. Other means could be used instead and any type of bidirectional motor could be controlled by a polarized relay arrangement responsive to variable D.C. output of a phase detector. In such case it should be understood that even a relay arrangement serves as "amplifying means."

There is thus provided apparatus of the class described capable of meeting the objects above set forth, with the "same side of sheet" techniques requiring less excitation power than would be the case otherwise, while at the same the "null plane" sensing results in a very high signal to noise ratio, likewise resulting in less excitation power being required, and combining (with same side of sheet techniques) to provide larger signals than prior art arrangements, hence the easy accomplishment of flaw responsive actuation of the principal equipment.

While I have illustrated and described particular embodiments, various modifications may obviously be made. Thus, rather than two field excitation coils and one sensing coil, as in FIGS. 1 and 2, there might be three excitation coils and two sensing coils, or nine exciters and eight sensors, or one exciter and two sensors, or other combinations of number of exciters and number of sensors, as in FIGS. 4, 5, 7, 8 and 9 of the above mentioned parent case Ser. No. 218,783, without departing from the true spirit and scope of the present invention which I intend to have defined only by the appended claims taken with all reasonable equivalents.

I claim:

1. In apparatus for positioning a pipe sample circumferentially according to an axially extending discontinuity therein, the combination of:
   an A.C. source of power,
   at least one pair of excitation coils connected with said source of power and arranged with axes substantially perpendicular to the pipe sample periphery while spaced apart around said periphery and oppositely polarized to establish a null plane between them,
   a mechanical drive for rotating the pipe,
   a reversible motor for operating said drive,
   amplifying means connected to said motor for effecting the rotation and direction of rotation of said motor,
   sensing coil means having an axis substantially coincident with said null plane and connected to operate said amplifying means and thus position the pipe according to the location of the discontinuity, said sensing coil being located on the outside of the pipe sample as are the excitation coils also, whereby all coils fall on the same side of the pipe as regards its minor, and material thickness, dimension.

2. The combination of claim 1 further characterized by there being a filter interposed between said sensing coil means and said amplifying means.

3. The combination of claim 1 further characterized by there being a first amplifying means fed by said sensing coil means,
   a phase detector arranged responsive to the output of said first amplifying means as compared to the phase of said A.C. source of power excitation,
   and a second amplifying means interposed between the phase detector and the reversible motor.

References Cited by the Examiner

UNITED STATES PATENTS

| | | | |
|---|---|---|---|
| 2,454,355 | 11/1948 | Sunstein | 318—31 |
| 2,921,179 | 1/1960 | Anderson | 219—125 |
| 2,957,129 | 10/1960 | Irwin | 324—37 |
| 3,017,496 | 1/1962 | Greene | 219—125 |
| 3,156,862 | 11/1964 | Herrick | 324—34 |

ORIS L. RADER, *Primary Examiner.*

B. DOBECK, *Assistant Examiner.*